Figure 13:
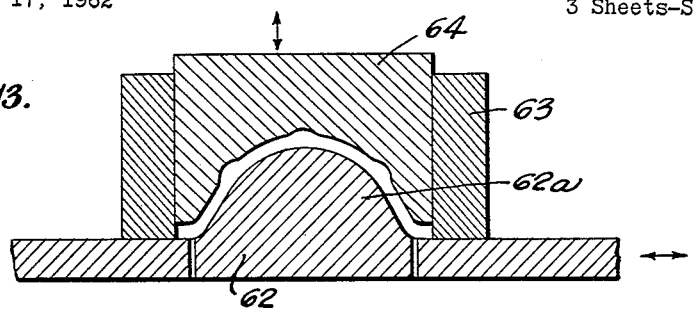

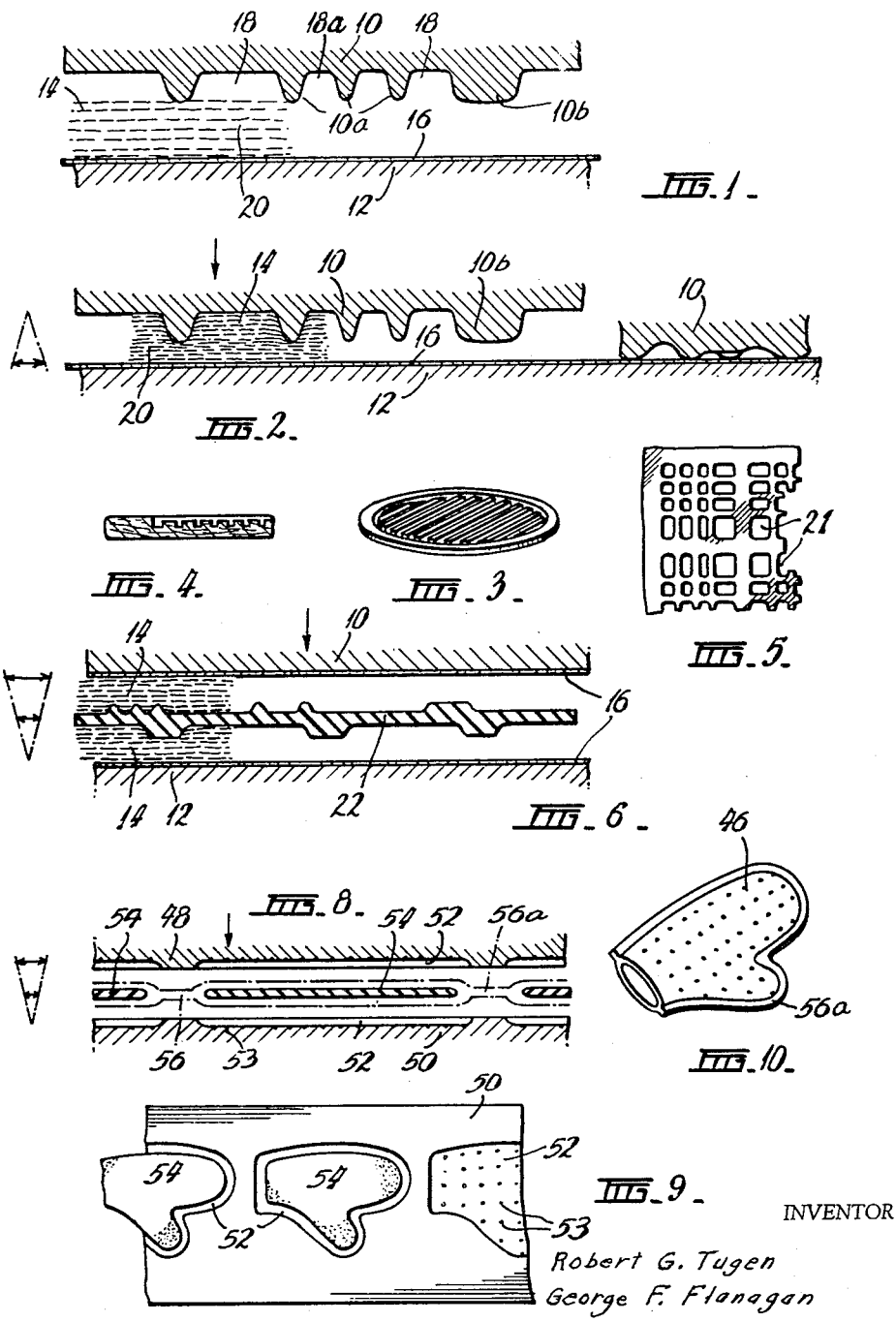

Sept. 15, 1964     R. G. TUGEN ETAL     3,148,435
APPARATUS FOR THE MANUFACTURE OF MOLDED FELT
Filed Sept. 17, 1962     3 Sheets-Sheet 3

INVENTOR
Robert G. Tugen
George F. Flanagan
BY
ATTORNEYS

United States Patent Office 3,148,435
Patented Sept. 15, 1964

3,148,435
APPARATUS FOR THE MANUFACTURE OF MOLDED FELT
Robert George Tugen, Hawthorn, Victoria, and George Francis Flanagan, Pascoe Vale, Victoria, Australia, assignors to Commonwealth Scientific and Industrial Research Organization, East Melbourne, Australia, a corporation of Australia
Filed Sept. 17, 1962, Ser. No. 223,953
Claims priority, application Australia, Sept. 27, 1961, 9,659/61; Apr. 18, 1962, 16,747/62; July 23, 1962, 20,260/62
15 Claims. (Cl. 28—14)

This invention relates to the formation of felt from wool or other feltable fibres or from mixtures thereof with other fibrous or like material.

Wool and other felts are generally produced in the form of flat sheets which are substantially uniform in thickness and have substantially smooth and featureless surfaces.

The formation of sheet felt is generally commenced in a machine known as a flat hardener which comprises upper and lower steam-heated platens arranged horizontally and the fibrous material—usually a batt comprising many layers of carded wool web—is rubbed and pressed between these platens while being subjected to the action of wet steam, thereby to produce a partly felted sheet which is self-sustaining and thus capable of being transferred to and subjected to a further felting treatment in a fulling machine or the like.

The upper platen is movable vertically and is weighted so as to subject the material to the requisite pressure, which usually is rather more than one pound per square inch, and the necessary rubbing action is usually produced by vibrating or shaking this platen in its own plane so that each point thereof reciprocates in a straight line or rotates in a circular or elliptical path, the stroke or diameter of this movement being dependent on the thickness of the felt to be formed and being usually about three-sixteenths of an inch though it is sometimes as much as two inches. Usually, the inner faces of the two platens are lined with heavy canvas for frictional engagement with the adjacent upper and lower surfaces of the fibrous layer and the surfaces of the platens are commonly grooved for gripping engagement with the canvas.

There is, therefore, a tendency for the upper and lower surfaces of the fibrous batt to remain in non-slipping engagement with the respective upper and lower platens so that when the upper platen is vibrated in its own plane and the lower platen is stationary, the lower surface of the batt tends to remain stationary while its upper surface is vibrated in unison with the upper platen. The batt is thus subjected to shearing stresses and the resultant strain or relative movement is distributed uniformly throughout the thickness of the batt so that each layer thereof moves relatively to each adjacent layer. As the said vibratory movements take place simultaneously with the application of pressure by the upper platen and with the introduction of wet steam, the felting action quickly develops with interlocking of the fibres and reduction of thickness of the layer thereof.

The felting action is believed to be due to the ratchet-like profile of sheep's wool and certain other animal fibres produced by the scales present on the surfaces thereof. The fibres in the batt act as pawls on the scales of adjacent fibres with the result that the fibres move and migrate relative to one another when pressed and rubbed together, particularly while subjected to the action of steam or other felting fluid. The fibres in a carded wool web are oriented so that they lie predominantly in the plane of the web, and due to the relative vibratory movements between the different layers of the web, during the hardening operation, some lateral displacement or migration of fibres takes place and, due to its aforesaid ratchet-like profile each fibre may be displaced more freely in one direction than in the opposite one. However, as the migration of fibres in each direction is substantially compensated by the migration of other fibres in the opposite direction, the number of fibres per unit volume remains substantially constant at all positions.

Now the general object of this invention is to provide novel felt products and methods of and apparatus for their manufacture.

Accordingly, the invention includes moulded felt having at least one non-planar surface, the expression "moulded felt" being used herein to designate felt produced by felting the constituent fibres together within a mould which imparts the requisite shape thereto.

The invention relates particularly to mould felt of varying thickness wherein the ratio of the density at the thinner portions thereof to the density at adjacent thicker portions is substantially less than the ratio of the thickness at said thicker portions to the thickness at said thinner portions.

The invention is particularly, but not exclusively, concerned with such felt articles which display abrupt and substantial variations in thickness. Thus, among other things, the invention includes felt fabric having a deep relief pattern moulded in at least one surface thereof.

The invention also includes felt fabric having spaced moulded openings extending therethrough and which may be analogous to lace in appearance.

The invention also includes the method of forming felt having at least one non-planar surface comprising subjecting a fibrous mass consisting wholly or largely of feltable fibres treated with steam or other felting fluid to pressure and to relative vibratory movements within a mould space defined between spaced mould members, one at least of which has a non-planar moulding surface adapted to control the distribution of the fibres within said mould space.

The said relative vibratory movements are preferably produced by vibrating a member defining one side of the mould space as in a conventional flat hardener and the opposed mould members advantageously have different frictional properties whereby the fibres in contact with one of them will slip thereover more freely than the fibres in contact with the other mould member. Certain felt products according to the invention are also capable of being produced in machines similar to known hardeners of the roller type.

The said mould members may be formed of rigid material or of resilient material which is sufficiently firm to impart substantially its preformed shape to the fibrous material during the felting operation and control the distribution of the fibres within the mould cavity.

An important form of the invention includes the formation of felt, especially felt which varies considerably in thickness, in a mould formed at least partly of resilient material which deforms during the felting operation so as to permit adequate relative vibratory movements of adjacent layers of fibres through substantially the full thickness of the felt.

More particularly, those portions of the mould which confine the fibrous material in the direction of vibration preferably have, or behave as though they have a resistance to deformation in shear which is of the same order as, but preferably is somewhat greater than, that of the felt to be formed as hereinafter more fully described.

The invention further includes simultaneously imparting vibrations in lateral and perpendicular directions to the fibrous material within a substantially completely enclosed mould cavity.

The required migration of fibres is facilitated when the fibres have only short distances to move from the narrower to the wider portions of the mould space and a better product is obtained when the free ends of mould elements defining narrow portions of the mould space are curved or inclined towards the adjacent wider portions of said mould space.

It is preferred that the mould be closed gradually as the operation proceeds, thereby to facilitate the migration of fibres from the narrower portions of the mould space by avoiding excessive pressure at those positions, while also, as the felt hardens and so becomes thinner, the amplitdue of vibration is preferably progressively reduced to an extent which is sufficient to prevent slipping between the felt and the mould members.

It has also been found to be advantageous, in some cases, to carry out a preliminary stage of the operation with the fibrous mass either dry or in a moist but unheated condition.

Finally, however, the fibrous mass is subjected to the action of wet steam or other heated felting fluid in order to complete the formation of the felt. Whereas, however, the formation of felt is not usually completed in a conventional flat hardener, the present invention permits of the formation of moulded felt articles by a single felting operation and for this purpose, the pressure finally applied to the felt, according to the present invention, is preferably greater than that applied by a flat hardener.

The invention further includes the formation of hollow felt articles comprising arranging a core member at least partly within a fibrous mass, and subjecting the latter to a felting operation whereby felt is formed about the said core member.

The invention also broadly includes felt having spaced openings or cavities formed therein by the removal, subsequent to the formation of the felt, of soluble constituents incorporated therein.

Thus the invention also includes the formation of felt comprising subjecting to a felting operation a mass of feltable fibres intermixed with or enclosing soluble fibres, filler pieces, cores or the like and subsequently dissolving the said soluble material.

The invention further includes moulds or the like for use in the formation of felt as above described, including moulds preferably comprising at least three relatively movable parts which define a substantially completely enclosed mould cavity.

The invention also includes a preshaped, shape-retaining mass of feltable fibrous material.

Still other features and applications of the invention are referred to in the following more detailed description wherein reference is made to the accompanying diagrammatic drawings, in which:

FIGURE 1 is a view in sectional elevation of apparatus for the manufacture of sheet felt with a deep relief moulded pattern, FIGURE 2 is a view showing a later stage in the production of patterned sheet felt in the apparatus of FIGURE 1, FIGURE 3 is a perspective view of a felt mat produced according to the invention.

Figure 14:
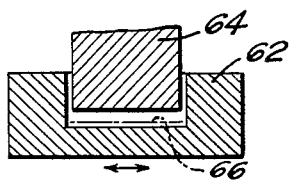
Figure 16:
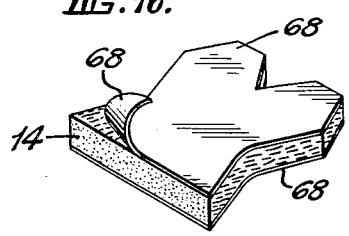
Figure 15:
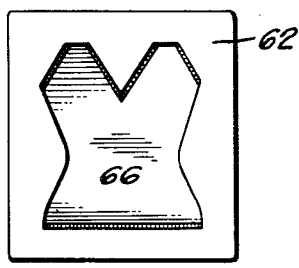
Figure 22:
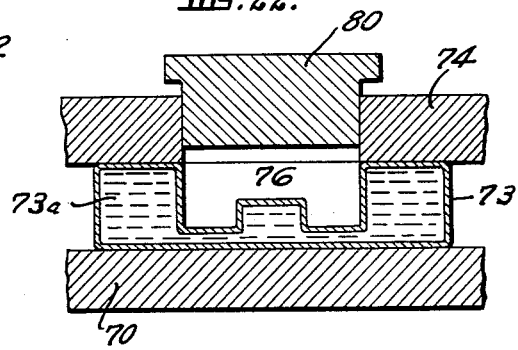
Figure 17:
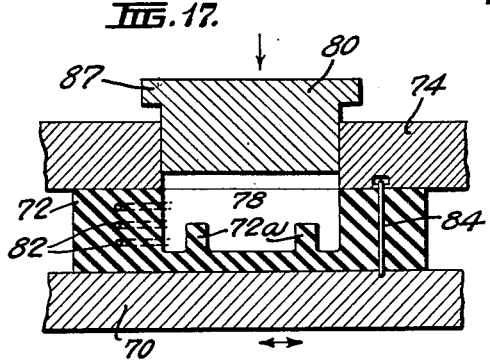
Figure 18:
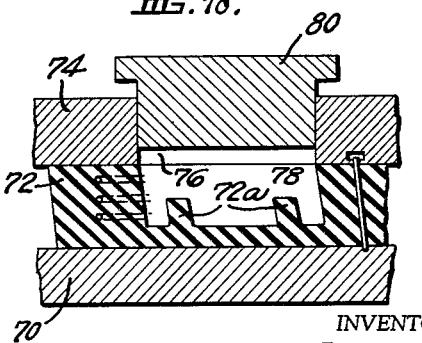
Figure 19:
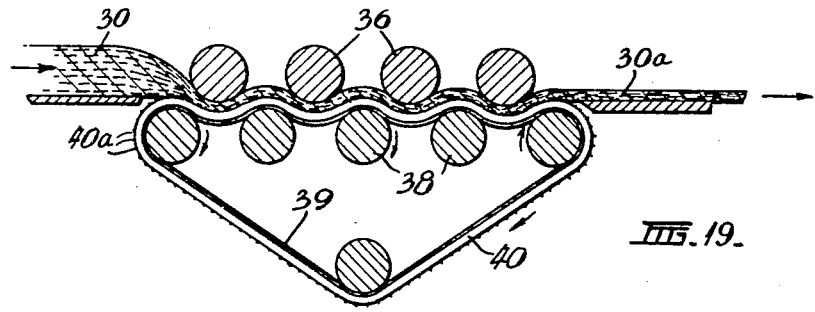
Figure 20:
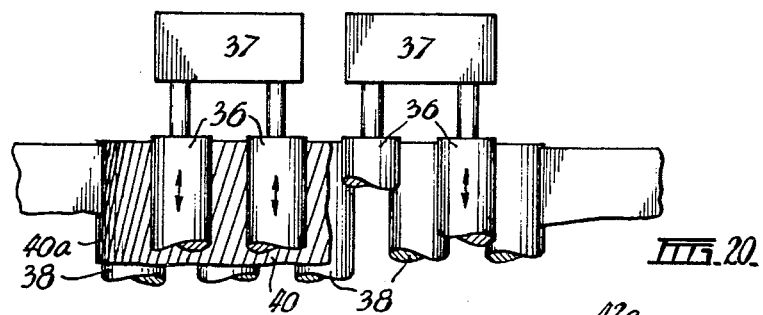
Figure 21:
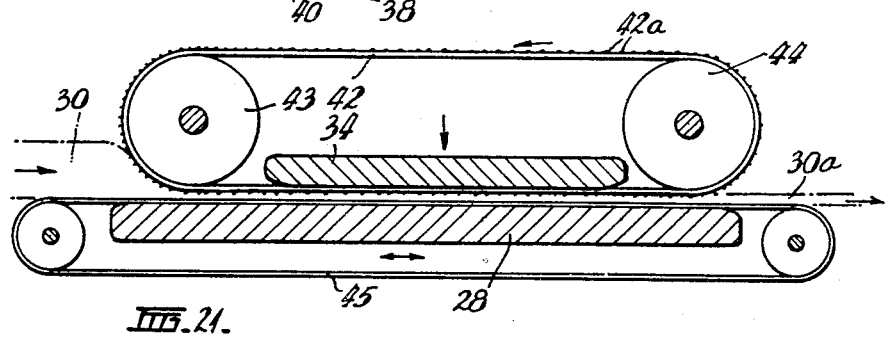
Figures 7, 11:
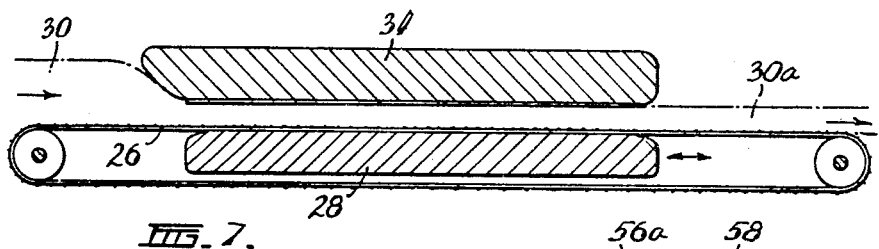
Figure 12:
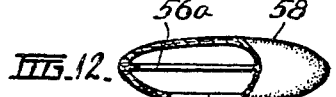

FIGURE 4 is a sectional view of a portion of the mat shown in FIGURE 3 and is approximately full size, FIGURE 5 is a view of moulded felt of lace-like form produced in the manner herein described, FIGURE 6 is a view in sectional elevation showing the simultaneous production of two felt sheets, FIGURE 7 is a view in sectional side elevation of apparatus for the formation of successive lengths of continuous sheet felt, FIGURE 8 is a view in sectional side elevation of apparatus for forming felt mittens, FIGURE 9 is a view in plan to a smaller scale of the apparatus of FIGURE 8 with the upper platen removed, FIGURE 10 is a perspective view of a mitten produced in the apparatus of FIGURES 8 and 9, FIGURE 11 is a sectional perspective view showing a stage in the production of a felt beret, FIGURE 12 is a view in side elevation and partly in section of a completed beret, FIGURE 13 is a view in sectional elevation of another type of mould for a hollow article, FIGURE 14 is a view in sectional elevation of a mould for forming a shaped flat felt fabric, FIGURE 15 is a view in plan of the mould shown in FIGURE 14, FIGURE 16 is a perspective view of a preshaped batt, FIGURE 17 is a view in sectional elevation of an enclosed resilient mould, FIGURE 18 is a view similar to FIGURE 17 showing the manner in which the mould is deformed when in use, FIGURE 19 is a view in sectional side elevation illustrating a multi-roller hardening machine modified for the continuous production of moulded sheet felt according to the invention, FIGURE 20 is a view in plan of a portion of the apparatus shown in FIGURE 19, FIGURE 21 is a view in sectional side elevation of another form of apparatus for the continuous production of sheet felt with a relief pattern, and FIGURE 22 is a view similar to FIGURE 17, but showing a modified form of the mold structure.

FIGURE 1 diagrammatically represents apparatus of the flat hardener type for the production of sheet felt with a deep relief pattern moulded in its upper surface. This apparatus comprises a vertically movable horizontal top platen 10 and a horizontal bottom platen 12 and one of these platens is arranged to be vibrated in its own plane as in a conventional flat hardener.

The upper platen 10 may be sufficiently heavy in construction to exert the required pressure on a batt 14, comprising feltable fibres which is arranged between the upper and lower platens in the usual way and conventional means (not shown) are provided for raising and lowering the upper platen.

The said batt may consist solely of sheep's wool, rabbit's fur or the like, or mixtures thereof, or it may consist of a mixture of such feltable fibres with other fibrous material, such as synthetic fibres. The number of layers in the batt determines the thickness of the felt and the batt is formed in the usual way, i.e. by placing successive layers of carded web, the one on top of the other, until a batt of the required weight is built up. It is preferred to use short fibre wool such as Merino 60/64s carbonized locks.

The illustrated portion of the upper platen is composed of rubber or other suitable resilient material formed with a deep relief pattern, the reverse of which is to be moulded in the upper surface of the felt sheet during the formation of the latter and this pattern comprises spaced projecting elements designated 10a and 10b and intervening recesses 18 and 18a.

The rubber or other resilient material is sufficiently firm to impart its preformed shape to the felt to be formed in the mould and sufficiently soft to enable the projections 10a and 10b to deform during the felting operation as hereinafter explained.

During the felting operation, each platen should grip the batt or felt so as to prevent the latter from slipping bodily thereon while still permitting migratory movements of individual fibres in contact therewith. Thus the objective is to provide a sufficiently intense gripping action on the batt or felt while exerting the minimum restraint on the migration of fibres and for this purpose, the surface of the lower platen 12 is roughened or, alternatively, is lined with suitable frictional material, such as heavy canvas 16.

The wool batt is initially uniform in thickness and density so that if it were merely compressed between the upper and lower platens so as to conform to the shape of the mould cavity defined between them, it would then vary abruptly in thickness from place to place and the density, i.e. the weight per unit volume, would vary approximately in inverse proportion to the variations in thickness thereof. Likewise, if the batt were formed into a sheet of felt of uniform thickness in the usual way and if the pattern of the upper platen 10 was then impressed into this sheet, the density of the latter would also vary from place to place.

According to the present invention, however, fibres are caused to migrate from the more shallow to the adjacent deeper portions of the mould space defined between the upper and lower platens 10 and 12 while the batt is still in a comparatively unfelted condition so that the upper surface of the felt sheet subsequently produced is moulded during the felting operation to the shape of the pattern on the upper platen 10 and the felt sheet so formed is substantially more uniform in density than a felt sheet having a similar pattern impressed therein as above described.

The required migration of fibres is effected by simultaneously subjecting the wool batt to downward pressure and to differential lateral vibration as in a conventional flat hardener and appears to be due, at least in part, to the fact that the pressure initially exerted by the top platen is more intense on those portions of the batt which are located immediately below the projecting mould elements 10a and 10b. Furthermore, it is believed that the greater angle of shear resulting at those positions from the closer spacing of the relatively moving mould members increases the rate of fibre migration and so assists in clearing excess fibres from those regions.

It will be apparent that as the felt hardens and becomes more thin, the tendency for slipping to occur between the felt and the mould members would increase if the effective amplitude of vibration remained constant. For this reason, as the operation proceeds, the amplitude is preferably decreased to an extent which is sufficient to ensure that slipping does not take place.

However, as the felting operation proceeds and the partly formed felt becomes more compact, the resilient projections such as 10a and 10b on the upper platen are deformed laterally by engagement with the laterally vibrated felt so that adjacent layers of fibres are moved relatively even within deep recesses such as those designated 18a and 18b. For this purpose, the resilient material preferably has a resistance to deformation in shear which is of the same order of magnitude as that of the felt so that the fibres within the said recesses undergo relative movements approximating those which they would undergo if the upper platen had a plane moulding surface.

Preferably the requisite felting pressure is progressively applied as the operation proceeds, as it is found that fibre migration is facilitated when the batt is subjected to lower pressures during the preliminary stages of the operation than during the later stages thereof. Such pressure regulation may, for example, be effected by suitable mechanical means. Alternatively, the batt may be subjected to a fluctuating pressure, such as by imparting vertical vibrations to either the upper platen 10 or the lower platen 12. During the final stages of the forming operation, the pressure applied is preferably substantially higher than the pressure applied by a conventional flat hardener and generally is of the order of several pounds per square inch, though the required density of the felt to be produced is a factor which influences the optimum maximum pressure.

The formation of the moulded felt also appears to be assisted when the frictional resistance to relative sliding movements between the pattern-bearing platen 10 and the adjacent surface of the batt is lower than that between the opposite platen 12 and the surface of the batt in contact therewith as is the case when, as shown by way of example in FIGURE 1, the platen 12 only is lined with canvas or the like.

The required migratory fibre movement also appears to be facilitated when the free ends of the projecting elements of the pattern, instead of being parallel to the plane of the platen 12, are inclined or of convex shape. Thus, in FIGURES 1 and 2, the ends of the elements 10a are convex while the free end of the wider element 10b inclines upwardly and outwardly at a small angle at each side of the center thereof.

It is, of course, necessary for the wool batt 14 to contain sufficient wool to fill the mould space tightly when the mould is finally closed, while also, the distance which the fibres have to travel from narrow portions of the mould space to adjacent wider portions thereof should, if possible, be small, and in some cases, this requirement may impose limitations on the designs which may be satisfactorily reproduced. In particular, it is very desirable to avoid mould members having inwardly projecting members of large area with flat free ends disposed parallel, or approximately parallel, to the plane of vibration. The invention therefore is especially applicable to the simultaneous formation and moulding of felt in a mould comprising alternate projections and recesses, each of which is narrow in at least one direction.

It has also been found advantageous to carry out the preliminary stages of the described operation with the wool batt in the dry condition as this treatment, which may be termed "dry felting," appears to facilitate the required fibre migration in some circumstances. Alternatively, during the said preliminary stages, the wool may be in a moist but unheated condition produced by treatment with unheated water or an unheated felting solution with the objective, in each case, of retarding the felting process while imparting the motion necessary to produce migration of the fibres. Nevertheless, satisfactory results have been obtained when the batt has been subjected to the action of wet steam or other heated felting fluid before or throughout the operation as in the conventional felt forming operation. The felting fluid may be supplied through holes (not shown) formed in the upper or lower platen, or both.

FIGURE 2 diagrammatically illustrates a late stage of the forming operation and in this figure, as well as in FIGURE 1, the uniform spacing of the light lines 20 is intended only to indicate that the felt or batt, as the case may be, is approximately uniform in density. In particular, no attempt has been made in FIGURE 2 to represent the actual arrangement of the fibres which, at that stage, extend and are intertwined in all directions.

FIGURES 3 and 4 show, by way of example, a circular felt mat produced in the manner described above, and it will be evident from FIGURE 4, which is drawn approximately full size, that patterns with fine detail can be accurately reproduced. This pattern comprises narrow parallel ribs separated by narrow parallel grooves so that its formation requires migration of fibers through short distances only.

It is also possible to continue the felting operation until some or all of the projecting elements, such as 10a and 10b, move downwardly into contact with the lower mould plate as shown at the right of FIGURE 2, in which case, spaced openings corresponding to these projections are formed in the felt layer. Thus, for example, sheet felt of fine or coarse lace-like form having spaced holes 21 therein may be produced as shown in FIGURE 5.

The present invention therefore permits of the production of felt formed with relief patterns or designs which may be either regular or irregular in form and of a wide variety of different kinds so that, among other things, they may simulate effects which are at present capable of being produced only by knitting or weaving or the like, though they are not limited thereto, as many designs which cannot be formed conveniently, if at all, by knitting or weaving, can readily be formed in the manner herein described. In this regard, it will be apparent that designs formed by knitting or weaving are subject to limitations which are due to the size and other characteristics of the yarns used and to the manner in which the yarns are interlaced, but the method herein described is not subject to those limitations.

Consequently, the present invention permits of the simple and economical production of improved felt materials which not only increase the scope and appeal of such materials for existing uses, e.g. for floor coverings and upholstery, but which additionally are suitable for many other purposes, such as the manufacture of clothing for which felted materials as at present known find but little application.

If desired, soluble fibres or other soluble material may be contained within the batt to be felted so as to be incorporated in the felt as produced in the mould, while subsequently, these soluble constituents may be removed in order to render the felt more soft, or to increase the porosity thereof. Thus, for example, the soluble constituents may be composed of alginates or of strips of paper or other pieces of cellulosic material, this latter material being removable, for example by carbonizing it with sulphuric acid in the well-known way.

The relief pattern is not necessarily provided on the upper platen 10, as it may alternatively be provided on the lower platen 12, or again, each platen may be formed with a pattern. Also, the resilient pattern bearing portion of the respective platen is not necessarily secured permanently to the body of the platen but preferably comprises a rubber mat which is removably secured to the platen body whereby different designs may conveniently be produced when required.

FIGURE 6 shows apparatus for the simultaneous production of two sheets of felt, each having a relief pattern moulded into one of its surfaces. For this purpose, a core sheet 22, formed of resilient material, such as rubber, and which has a pattern moulded in each face thereof, is interposed between two wool batts 14 arranged one above the other and between the upper and lower platens 10 and 12 respectively of a flat hardener. Thus the core member forms a floating partition between the two batts and it will be apparent that two or more such floating core sheets may be arranged in spaced positions between the platens so as to produce more than two felt products simultaneously.

FIGURE 7 shows a construction which may be used in order to produce continuous sheets of felt in successive stages. Thus the upper stretch of an intermittently operated endless rubber belt 26 having the required pattern moulded thereon passes over the lower platen 28 and serves to convey the batt 30 thereto and to discharge the felt 30a therefrom, and any conventional means (not shown) are provided for vibrating either the platen 28 or the upper platen 34 which is vertically movable in the usual way.

During each felt forming operation, the pattern belt 26 is stationary and when the operation is completed, the upper platen is raised and the belt 26 is actuated so as to remove the completed length of felt from the moulding position and simultaneously to replace it with a similar length of the unfelted batt 30.

The invention is also applicable to the formation by a single operation of hollow moulded felt articles, such as the industrial felt mitten 46 shown in FIGURE 10. Thus, as shown in FIGURES 8 and 9, such hollow articles are produced in a mould comprising upper and lower platens 48 and 50 respectively, formed with shallow vertically aligned recesses 52 of the requisite shape and the bottoms of these recesses may be formed with a relief pattern 53. The felt is formed around suitably shaped floating core members 54 which are embedded in the fibrous material (not shown) arranged between the upper and lower platens, each core member being disposed in alignment with and correctly oriented with respect to, the corresponding recess 52. Preferably, a batt is placed on the lower platen after which the core members are placed thereon and finally a second batt is placed on top of them as already described with reference to FIGURE 6.

The fibrous material is then subjected to pressure and relative vibratory movements as already described whereby fibre migration and felting of the fibres proceed more or less simultaneously, the migration being into the deeper portions of the mould cavity from the adjacent shallower portions thereof.

When the felting operation is completed, each core member 54 is completely embedded in the felt sheet 56 shown in broken lines in FIGURE 8. Each mitten 46 or other hollow article is then cut from the solid felt sheet, a narrow surround 56a of the latter being preferably left to reinforce the edges. The mitten is also cut open at the wrist end and the core 54, which is formed of rubber or other suitable flexible material, is withdrawn through this opening. For some purposes, however, a core may advantageously be formed of soluble material to permit of its removal without cutting the moulded felt article.

The circular beret 58 shown in FIGURE 12 is similarly formed as shown in FIGURE 11. In this case, the core member 54 is a circular rubber disc which is subsequently removed through a circular opening 60 which is moulded in one side of the article or cut centrally therein after it has been removed from the external mould. The beret is then advantageously turned inside out as shown in FIGURE 12 to conceal the flat surround 56a which has been left when the beret has been cut from the solid felt sheet. For this purpose, the surfaces of the core member 54 may be formed with a relief pattern 54a so that this pattern will be on the outer surface of the beret when it is reversed.

Another type of mould for the formation of a hollow felt article, such as a hat, is shown in FIGURE 13 wherein the lower mould member 62 slidably supports a tubular mould 63 formed with a cavity of the requisite plan shape. The lower mould member has a central upward projection 62a arranged within the tubular mould and corresponding to the internal shape of the hollow article to be formed. The upper member 64 of the mould, which has its lower end shaped to conform to the external shape of the article to be moulded, projects neatly into the cavity in the tubular mould so that the latter slides on the lower mould when either the latter or the upper mould member is vibrated laterally. Preferably, the lateral vibratory movements are imparted to the lower mould member while the upper mould member is simultaneously vibrated vertically with a different frequency.

FIGURES 14 and 15 show a somewhat similar type of mould for forming one half 66 of a garment bodice having a relief surface pattern on one side thereof so that in common with the other felt products shown in the drawings, it has a non-planar surface. If desired, the illustrated upstanding wall of the lower mould may be replaced by a tubular mould as shown in FIGURE 13, thus obviating the necessity for providing a substantial clearance space about the upper mould member. As shown, the moulded felt fabric is flat, though it will be evident from FIGURE 13 that this is not essential.

It will be apparent that the wool batts 14 for use in moulds of the kind shown in FIGURES 13, 14 and 15, require to be preshaped to conform to the cavity in the lower mould member and such preshapes may be cut or stamped from a batt of the requisite thickness so as to be available in compressed and set condition for use when required. For this purpose, the batt may be steam pressed or lightly felted or treated with a soluble bonding agent, such as soap or gelatine to hold the fibres together while the preshape is being formed and which subsequently is dissolved by the felting fluid or otherwise.

Alternatively, or in addition, each side of the batt may be lined with sheet material 68 as shown in FIGURE 16 to hold the batt together while the preshape is being formed. This sheet material may be paper, in which case, it is removed before the batt is placed in the mould or, alternatively, it may be formed of soluble material which will dissolve during the felting operation.

In order to produce thick felt articles in an enclosed mould or felt articles which vary considerably in thickness, it is preferred to use a mould formed at least partly of resilient material, particularly when the fibrous material is vibrated in one plane only and the mould or a deep cavity therein is narrow in the plane of vibration.

Thus if, for example, the illustrated lower portion of the upper mould member 10 shown in FIGURES 1 and 2 was formed of metal instead of resilient material, the relative vibration of fibres located near the bottom of a deep narrow recess, such as the recess 18a, would be restricted due to the shielding effect of the side walls of the recess. Consequently, when such a recess is very deep and narrow, the relative movement of the fibres within the bottom portion thereof may be insufficient to provide a satisfactory felting action.

Consequently, an important feature of the invention resides in a mould formed at least partly of resilient material which is deformed during the felting operation so as to permit of or produce relative movement of the fibres throughout the depth of the mould.

More particularly, the resistance to deformation in shear of the resilient material of the mould is preferably of the same order of magnitude as that of the felt to be formed therein or, alternatively, the mould is constructed so that the resilient portion thereof is constrained to deform in a corresponding manner.

One application of this aspect of the invention is shown in FIGURE 17 as applied to the enclosed mould for a thick circular felt disc having an annular groove in one of its ends. This mould comprises a rigid bottom plate 70 which is vibrated in its own plane and which has the bottom of a resilient body mould 72 cemented or otherwise secured thereto.

The upper end of the body mould is similarly secured to a rigid top plate 74 which is prevented from moving laterally but which may be movable vertically. This top plate is formed with a circular hole 76 which constitutes an upward continuation of the cavity 78 in the resilient body mould and a further rigid member 80 extends slidably into the hole 76 to close the top of the mould cavity and impart the necessary pressure to the material therein.

While it is not essential to secure the resilient body mould to the upper and lower platens, it is preferred to do so in order to prevent slipage and consequent wear.

Consequently, when the lower plate 70 is vibrated in its own plane, the bottom of the body mould is constrained to move bodily therewith while the upper end of the body mould remains stationary. The rim of the body mould is therefore deformed as shown in FIGURE 18 while the annular projection 72a is similarly deformed as shown if its elasticity corresponds approximately to that of the fibrous material. Thus the distortion of the mould enables the fibres throughout the full depth of the cavity therein to undergo vibratory movements of the same order of magnitude as they would undergo if they were not laterally confined.

Final consolidation of the felt may, if desired, be produced by compressing the body mould axially, and for this purpose, an external collar 87 may be formed on the slidable mould member 80 to engage and depress the top plate 74.

The resilient body mould could, if desired, be reinforced by embedding therein a series of spaced co-axial rings 82 shown at the left of FIGURE 17, these rings being disposed parallel to the plane of vibration so as not to interfere with the deformation of the mould in the manner shown in FIGURE 18. Alternatively, and as shown at 84 at the right of FIGURE 17, a plurality of spaced rods passing longitudinally through the rim of the resilient body mould may have their ends rockably mounted in shallow seating recesses in the upper and lower plates.

Thus the required distortion of a flexible or resilient mould may be due either to the intrinsic physical properties of the material of which it is composed or to mechanical or other means by which it is constrained to distort in a predetermined manner.

The said resilient body mould may be formed of any suitable material, e.g. sponge rubber or foam plastic.

In lieu of using homogeneous flexible or resilient moulds, for example, moulds comprising relatively thick-walled mouldings of rubber or other suitable material, the moulds, as shown in FIG. 22, may comprise thin-walled flexible members 73 surrounded or backed by a suitable filling material 73a. The filling material may, for example, consist of separate pieces or fragments of rubber or the like or it may be a non-resilient material such as a viscous liquid which is resistant only to shear. The use of such a liquid provides the important advantage that its shear resistance is readily controllable by regulating either its temperature or the frequency of vibration. Thus the shear resistance is increased by lowering the temperature or increasing the frequency and vice versa.

A similar regulation of shear resistance is obtainable if the mould is formed of a suitable moulded plastic such, for example, as polyvinyl chloride, as the resistance of this material to deformation in shear increases as the temperature decreases so that if the temperature of the mould was reduced at the appropriate stage, the mould would become harder as the hardness of the felt increased during the felting operation.

According to yet another modification, the mould itself may be formed of felt and this is advantageous as this material possesses the desired degree of ridigity and a plurality of such moulds could be formed either separately or in the form of a long strip or belt by the use of a master pattern. Such felt moulds are preferably treated with a bonding agent to assist in retaining the mould shape and prevent further felting and hardening and also to prevent the penetration by fibres from the batt being felted therein.

Some felt products according to the invention may also be produced in a known type of multi-roller felting hardening machine. Thus, FIGURES 19 and 20 show a machine of this kind comprising an upper series of spaced parallel rollers 36 supported in fixed bearings and arranged to be reciprocated axially by cams in boxes 37. The upper rollers 36 coact with a lower series of spaced rollers 38 carried by a vertically movable frame (not shown) which is urged upwardly by air cylinders or otherwise to exert the required pressure on the batt 30 and felt 30a as it passes between the upper and lower rollers and the latter are driven in unison to move the material continuously through the machine. Usually, an endless band 39 passes over the rollers 38 and around a further roller arranged therebelow in order to support the felt between the rollers.

For the purpose of the present invention, an endless belt 40 having the required pattern 40a formed on its outer surface passes around the lower rollers 38 and is continuously moved thereby, this pattern belt being optionally arranged about the usual supporting band 39. Thus the space between the belt 40 and the coacting portion of each upper roller 36 forms a mould space as herein defined.

It will be apparent that with this apparatus, the felt sheet 30a is formed continuously instead of intermittently as in the construction of FIGURE 7, and that two or more felt sheets could be formed simultaneously by arranging a flexible core sheet between two batts substantially as described above with reference to FIGURE 6.

In the modification shown in FIGURE 21, an endless rubber band 42 formed with the required pattern 42a passes around spaced rollers 43 and 44, one of which is driven continuously to drive the band at a low speed, and the lower stretch of this band moves over the lower surface of the upper platen 34 of a flat hardener while the upper stretch of a conveyor belt 45 moves over the surface of the lower platen 28.

We claim:

1. Felt forming apparatus comprising a mould formed at least partly of resilient material, said mould including opposed mould members defining an intervening mould space for feltable fibrous material, said mould members being movable towards each other thereby to compress the fibrous material within the mould space, said mould members being also relatively reciprocable in a direction disposed at an angle to the direction of compression whereby vibratory movements may be imparted to the fibrous material, and said resilient material being arranged so as to be deformed during said vibratory movements and so as to confine at least some of the fibrous material in the direction of vibration whereby adjacent fibres so confined undergo relative vibratory movements.

2. Felt forming apparatus comprising an opposed pair of mould members defining an intervening mould space for feltable fibrous material, spaced projections of resilient material on the inner face of one of said mould members, said mould members being movable towards each other thereby to compress the fibrous material within the mould space, said mould members being also relatively reciprocable in a direction disposed substantially at right angles to the direction of compression whereby vibratory movements may be imparted to the fibrous material, and said resilient material having a flexibility such that said projections are deformed during the felting operation whereby adjacent fibres confined between said projections undergo relative vibratory movements.

3. Felt forming apparatus comprising opposed mould members defining an intervening mould space which varies in thickness from place to place, the inner face portion at least of one of said mould members being formed of resilient material, said mould members being movable towards each other thereby to compress the fibrous material within the mould space and means operable to impart relative vibratory movements to said mould members substantially at right angles to the direction of compression, and said resilient material having a flexibility such that it is deformed by contact with the fibrous material when the latter is vibrated.

4. Felt forming apparatus comprising an opposed pair of mould members defining an intervening mould space for feltable fibrous material, said mould members being movable towards each other thereby to compress the fibrous material within the mould space, said mould members being also relatively reciprocable in a direction disposed substantially at right angles to the direction of compression whereby vibratory movements may be imparted to the fibrous material and a core mould member of resilient material arranged between and spaced from said firstmentioned mould members, said core mould member being formed with a relief pattern on at least one face thereof.

5. Felt forming apparatus comprising spaced upper and lower mould members of substantially horizontal platelike form, means operable to vibrate one of said members substantially horizontally, means operable to move one of said members substantially vertically towards the other and a floating core member of resilient material arranged between and spaced from said upper and lower mould members to serve as a partition between upper and lower masses of feltable fibrous material whereby separate felt articles are formed on opposite sides of said core member, said core member having a relief pattern formed on at least one surface thereof.

6. Felt forming apparatus comprising spaced upper and lower mould members of substantially horizontal platelike form, means operable to vibrate one of said members substantially horizontally, means operable to move one of said members towards the other, said members being formed in their adjacent inner faces with aligned recesses conforming to the external shape of a hollow felt article to be formed, and a floating core member of resilient material adapted to be at least partly embedded in a fibrous mass arranged between said upper and lower members, said core member conforming to the internal shape of the said hollow felt article.

7. Felt forming apparatus comprising an opposed pair of mould members defining an intervening mould space for feltable fibrous material, said mould members being movable towards each other thereby to compress the fibrous material within the mould space, said mould members being also relatively reciprocable in a direction disposed substantially at right angles to the direction of compression whereby vibratory movements may be imparted to the fibrous material, an endless belt of resilient material, means supporting said belt so that one stretch thereof extends through the mould space, said belt having a pattern formed in relief on at least one face thereof, and means for moving said belt along the endless path thereof.

8. Felt forming apparatus comprising a substantially horizontally disposed upper mould member, a substantially horizontally disposed lower mould member, said mould members defining an intervening mould space for feltable fibrous material, spaced projections of resilient material on the inner face of one of said mould members whereby some of said fibrous material is confined between said projections, one of said mould members being movable substantially vertically towards the other thereby to compress the fibrous material within the mould space, said mould members being also relatively horizontally reciprocable whereby vibratory movements may be imparted to the fibrous material and said resilient material being sufficiently firm to impart its preformed shape to the fibrous material and sufficiently soft to be deformed by the fibrous material as the latter is vibrated whereby adjacent fibres confined between said projections undergo relative vibratory movements.

9. Felt forming apparatus comprising substantially horizontally disposed upper and lower mould members defining an intervening mould space, the inner face portion at least of one of said mould members being formed of resilient material, spaced projections on said resilient material extending into the mould space, the said projections being arranged so that some of said fibrous material is confined therebetween, one of said mould members being movable towards the other mould member thereby to compress the fibrous material within the mould space, and means operable to impart substantially horizontal vibratory movements to one of said mould members, and wherein the resistance to deformation in shear of said resilient material is of the same order of magnitude as that of felt.

10. Felt forming apparatus comprising a mould formed at least partly of resilient felt treated with a bonding agent to prevent further hardening thereof and to resist penetration by external fibres, said mould including opposed mould members defining an intervening mould space for feltable fibrous material, said mould members being movable towards each other thereby to compress the fibrous material within the mould space, said mould members being also relatively movable in a direction disposed at an angle to the direction of compression, whereby vibratory movements may be imparted to the fibrous material, said resilient felt being arranged so as to confine at least some of the fibrous material in the direction of vibration and said felt being sufficiently soft to be deformed by the feltable fibrous material when the latter is compressed and vibrated whereby adjacent fibres confined thereby undergo relative vibratory movements.

11. Felt forming apparatus comprising a mould member formed at least partly of resilient material, said mould member having a mould cavity therein, a coacting mould member adapted to project neatly into the cavity thereby to compress feltable fibrous material therein, and means for imparting relative vibrations to said mould members substantially at right angles to the direction of compression whereby said resilient mould member is subjected to vibratory deformation.

12. Felt forming apparatus comprising a body mould formed of resilient material such as rubber, said body mould having therein a mould cavity which is open at one side at least of said body mould, a rigid plate secured to the lastmentioned side of the body mould, said plate being formed with a hole which registers with said mould cavity, a further rigid plate secured to said body mould at the opposite side thereof to the firstmentioned plate and a further mould member adapted to project neatly into said hole in the firstmentioned plate thereby to compress feltable fibrous material within the mould cavity and whereby the resilient body mould may be periodically deformed by imparting relative vibratory movements to said rigid plates.

13. Felt forming apparatus comprising a backing member, a mould member of thin resilient material so arranged relatively to said backing member that a closed space is formed therebetween, a viscous liquid substantially filling said closed space so as to resist deformation of said resilient mould member, a second mould member spaced from said resilient mould member whereby a space for feltable fibrous material is formed therebetween, means for moving one of said mould members towards the other thereby to compress the fibrous material, and means for vibrating one of said mould members substantially at right angles to the direction of compression.

14. Felt forming apparatus comprising an opposed pair of platens defining an intervening mould space for feltable fibrous material, said platens being movable towards each other thereby to compress feltable fibrous material therebetween, means operable to reciprocate one of said platens in a direction disposed substantially at right angles to the direction of compression whereby vibratory movements may be imparted thereby to the fibrous material, an endless belt of resilient material, means supporting said belt so that a stretch thereof extends through the space between the platens with one face of said stretch disposed substantially in contact with one of said platens, said belt having a pattern formed in relief on the other face thereof, and means operable to move said belt along the endless path thereof.

15. Felt forming apparatus comprising an upper horizontal platen and a lower horizontal platen defining an intervening mould space for feltable fibrous material, one of said platens being movable vertically towards the other thereby to compress the fibrous material within the mould space, means operable to reciprocate one of said platens substantially horizontally thereby to impart vibratory movements to the fibrous material, an endless belt of resilient material, spaced pulleys supporting said belt so that one stretch thereof is disposed externally of said mould space while the other stretch thereof extends through the mould space with one face thereof disposed substantially in contact with one of said platens, said belt having a pattern formed in relief on the other face thereof; means operable to move said belt continuously along the endless path thereof for engagement with the fibrous material, an endless conveyor belt, spaced pulleys supporting said conveyor belt so that one stretch thereof is disposed externally of the mould space and the other stretch thereof extends through the mould space with one face thereof substantially in contact with the other one of said platens, and means operable to move said conveyor belt continuously around its endless path so that those stretches of the two belts which extend through the mould space move in the same direction and at substantially the same speed.

References Cited in the file of this patent

UNITED STATES PATENTS

| | | |
|---|---|---|
| 331,501 | Hyatt | Dec. 1, 1885 |
| 381,012 | Hawley | Apr. 10, 1888 |
| 527,283 | Heaton | Oct. 9, 1894 |
| 946,975 | Muhlfeld | Jan. 18, 1910 |
| 2,012,303 | Clements | Aug. 27, 1935 |
| 2,136,827 | Schur | Nov. 15, 1938 |
| 2,472,263 | Pasko | June 7, 1949 |
| 2,495,923 | Evers | Jan. 31, 1950 |
| 2,774,128 | Secrist | Dec. 18, 1956 |
| 2,774,129 | Secrist | Dec. 18, 1956 |
| 2,936,512 | Casse | May 17, 1960 |
| 2,974,394 | Walton | Mar. 14, 1961 |